United States Patent
Kojic et al.

(10) Patent No.: US 6,953,020 B2
(45) Date of Patent: Oct. 11, 2005

(54) CONTROL OF AUTO-IGNITION TIMING FOR COMBUSTION IN PISTON ENGINES BY PRECHAMBER COMPRESSION IGNITION

(75) Inventors: Aleksandar Kojic, Cupertino, CA (US); Jean-Pierre Hathout, San Jose, CA (US); David Cook, Stanford, CA (US); Jasim Ahmed, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/681,072

(22) Filed: Oct. 7, 2003

(65) Prior Publication Data

US 2005/0072400 A1 Apr. 7, 2005

(51) Int. Cl.[7] .............................................. F02B 19/10
(52) U.S. Cl. ...................... 123/256; 123/48 D; 123/258
(58) Field of Search ................................ 123/256, 258, 123/259, 285, 286, 292, 62, 66, 70 R, 48 D

(56) References Cited

U.S. PATENT DOCUMENTS

| | | | | | |
|---|---|---|---|---|---|
| 3,957,021 | A | * | 5/1976 | Loyd, Jr. .................... 123/209 |
| 4,516,537 | A | * | 5/1985 | Nakahara et al. ....... 123/48 AA |
| 4,860,711 | A | * | 8/1989 | Morikawa ................. 123/48 D |
| 5,010,860 | A | * | 4/1991 | Broussard ................... 123/256 |
| 5,179,839 | A | * | 1/1993 | Bland .......................... 60/712 |
| 5,826,558 | A | * | 10/1998 | Kawamura .................. 123/292 |
| 6,073,605 | A | * | 6/2000 | Matsuoka et al. .......... 123/292 |
| 6,079,373 | A | * | 6/2000 | Kawamura .................... 123/3 |
| 6,260,520 | B1 | * | 7/2001 | Van Reatherford ..... 123/48 AA |
| 6,340,013 | B1 | * | 1/2002 | Britton ....................... 123/255 |
| 6,450,154 | B1 | * | 9/2002 | Choi .......................... 123/536 |
| 6,578,533 | B1 | * | 6/2003 | Gray, Jr. ................... 123/78 D |
| 6,595,181 | B2 | | 7/2003 | Najt et al. .................. 123/295 |
| 6,606,973 | B2 | * | 8/2003 | Moe .......................... 123/228 |
| 6,694,944 | B2 | * | 2/2004 | Agama et al. ............. 123/292 |
| 6,708,654 | B2 | * | 3/2004 | Cowans .................... 123/48 R |
| 2003/0075121 | A1 | * | 4/2003 | Dixon ...................... 123/48 A |
| 2003/0116121 | A1 | | 6/2003 | Agama et al. |

* cited by examiner

*Primary Examiner*—Hai Huynh
(74) *Attorney, Agent, or Firm*—Kenyon & Kenyon

(57) ABSTRACT

A method and system of controlling auto-ignition timing in an internal combustion engine cylinder in which the timing of auto-ignition in prechambers that are coupled to the cylinder is precisely controlled. The auto-ignition in the prechambers is produced by a compression stroke using pistons situated within the prechambers. Hot gas jets produced by the prechamber auto-ignitions are introduced into the charge space of the cylinder and rapidly induce a second auto-ignition of the mixture in the cylinder. By precisely controlling the timing of the auto-ignitions within the prechambers, the timing of the auto-ignition within the cylinders can, in turn, be precisely controlled.

19 Claims, 4 Drawing Sheets

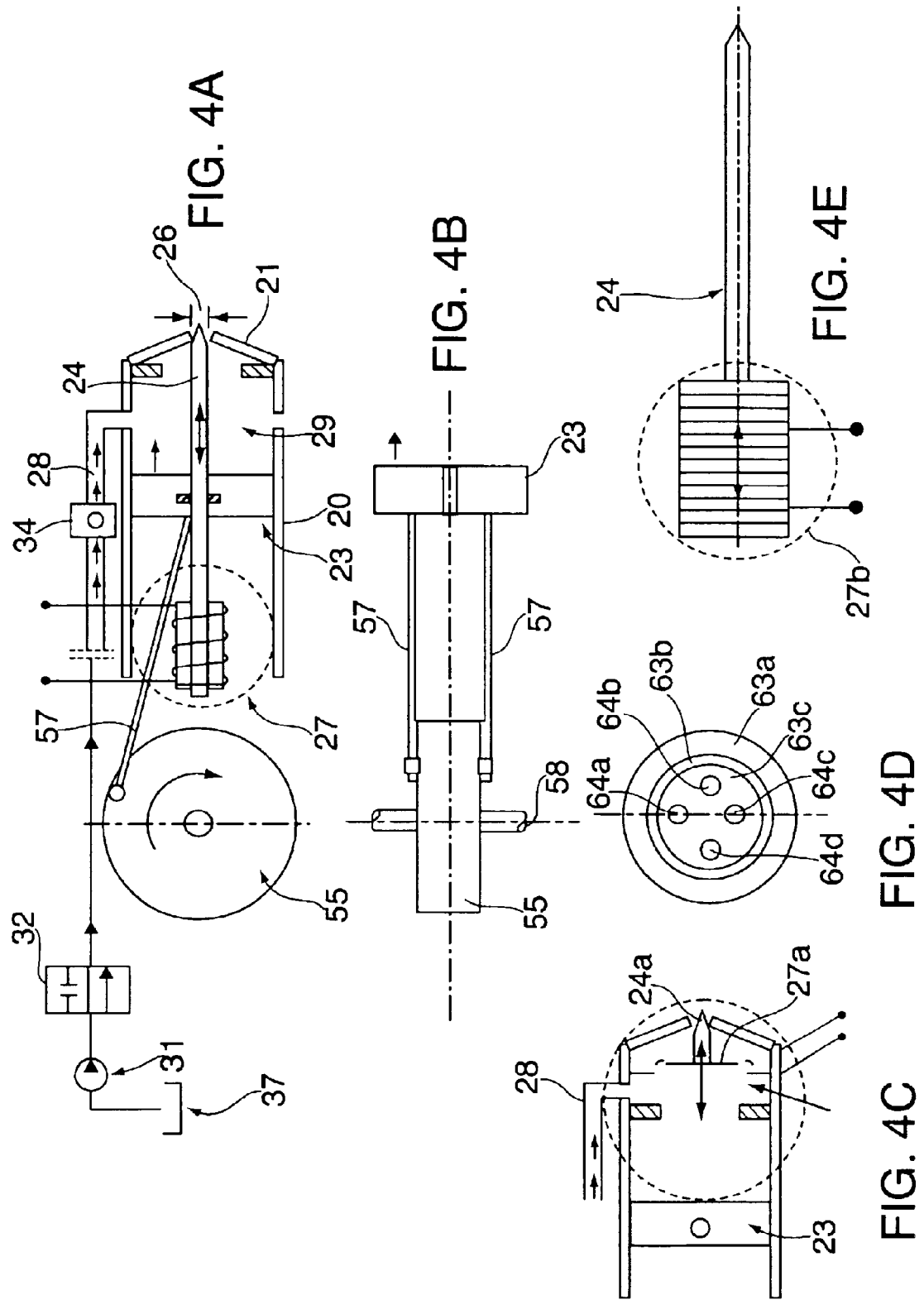

CONTROL OF AUTO-IGNITION TIMING FOR COMBUSTION IN PISTON ENGINES BY PRECHAMBER COMPRESSION IGNITION

RELATED APPLICATIONS

This application is related to concurrently-filed U.S. patent application Ser. No. 10/681,056 entitled, "Control of Auto-ignition Timing for Homogeneous Combustion Jet Ignition Engines".

FIELD OF THE INVENTION

The present invention relates to a method and system for initiating combustion in a cylinder of an internal combustion engine, and more particularly relates to a Homogeneous Combustion Jet Ignition system and method in which hot gas jets produced by compression ignition in cylinder prechambers induce auto-ignition of the contents of the cylinder.

BACKGROUND INFORMATION

There is an ever-greater need and demand for combustion techniques that minimize emissions through efficient burning of fuel components. One such technique is Homogeneous Charge Compression Ignition (hereinafter "HCCI") in which a well-mixed, lean mixture of fuel and air is auto-ignited, i.e., ignited without use of a spark, which usually results in a rapid combustion of fuel components. This combustion technique is potentially more efficient and environmentally-friendly than conventional spark-ignited combustion because the rapidity of the combustion prevents heat losses to the walls of the engine cylinder, approaching a constant volume combustion which is more efficient and allows for use of a higher compression ratio, and also because use of a well-mixed, lean mixture results in a decrease in the total production of pollutants, some of which are almost completely eliminated.

The practical implementation of HCCI has been somewhat hampered by the difficulty of controlling the auto-ignition under variable loading conditions. It has been found that small variations in the temperature field within the engine cylinder can produce large variations in ignition timing, and can result in misfire, in which combustion fails to occur, or other deleterious consequences which reduce engine efficiency.

In another promising technique, referred to as the Pulsed Jet Combustion method (hereinafter "PJC"), combustion is initiated in small prechambers coupled to the cylinder via small orifices. Combustion in the prechambers produces hot jets of gas which escape through the orifices into the cylinder where the jets entrain unburned gases in the fuel-air mixture in the cylinder, igniting the mixture. The action of the jets improves combustion efficiency because of the "fireball" created that rapidly spreads through the volume of the cylinder, in contrast to the thinner "flame" that is produced by spark ignition. However, current PJC techniques employ spark-ignition within the prechambers, and therefore combustion within the prechambers suffers to some degree from the uneven combustion and inefficiencies associated with spark-ignition. Additionally, the combustion produced in the cylinder using PJC is not volumetric as in HCCI, but depends upon the spread of the fireball from the prechamber, which may not be completely uniform. Therefore, combustion in the cylinder may also be somewhat uneven and some portion of the hydrocarbon fuel may remain unburned.

SUMMARY OF THE INVENTION

The present invention provides a Homogeneous Combustion Jet Ignition technique (hereinafter denoted as "HCJI") that combines the advantages of HCCI and PJC, while simultaneously eliminating their respective drawbacks.

The present invention provides a method of controlling auto-ignition timing in an internal combustion engine cylinder by employing auto-ignition in one or more prechambers that include their own "prechamber" pistons. Gases within the prechambers are compressed using the prechamber pistons at precisely controlled times to cause auto-ignition in the prechambers. The auto-ignition in the prechambers produces hot gas jets that are introduced into the charge space of the cylinder; the hot gas jets rapidly induce a second auto-ignition of the mixture in the cylinder. Accordingly, by precisely controlling the timing of the "starter" auto-ignitions within the prechambers, the timing of the auto-ignition within the cylinders can, in turn, be precisely controlled.

According to a specific embodiment of the method of the present invention, the prechamber piston(s) is controlled so as to compress the gases in the prechamber(s) when the cylinder piston is near a top dead center position while the microvalve(s) connecting the prechamber(s) to the cylinder is in a closed position. Auto-ignition occurs in the prechamber(s) upon compression after a short time delay. Upon completing the compression stroke the prechamber piston(s) remains in position during auto-ignition in the prechamber and during the interval when hot gas jets emanate from the prechamber into the cylinder.

The present invention also provides a system for Homogeneous Combustion Jet Ignition (HCJI) in an internal combustion engine cylinder. The system includes an electronic control unit and one or more prechambers coupled to the cylinder via at least one microvalve, with each of the prechambers including a prechamber piston. The electronic control unit receives data regarding requested load demand and current operating parameters within the cylinder and is configured to control the prechamber piston and the at least one microvalve based on the received data so as to induce an auto-ignition within the at least one prechamber.

BRIEF DESCRIPTION OF THE DRAWINGS

FIG. 4a shows a longitudinal cross-section of an exemplary embodiment of a prechamber and microvalve assembly that may be used in the context of the present invention.

FIG. 4b shows a top view of the rotary mechanism and piston depicted in FIG. 4a.

FIG. 4c shows an alternative embodiment of a prechamber and microvalve assembly that may be used in the context of the present invention.

FIG. 4d shows a plan view of the piezo-actuated membrane shown in FIG. 4c.

FIG. 4e shows another alternative embodiment of an actuator that may be used in the assembly of FIG. 4a.

DETAILED DESCRIPTION

Figure 1:
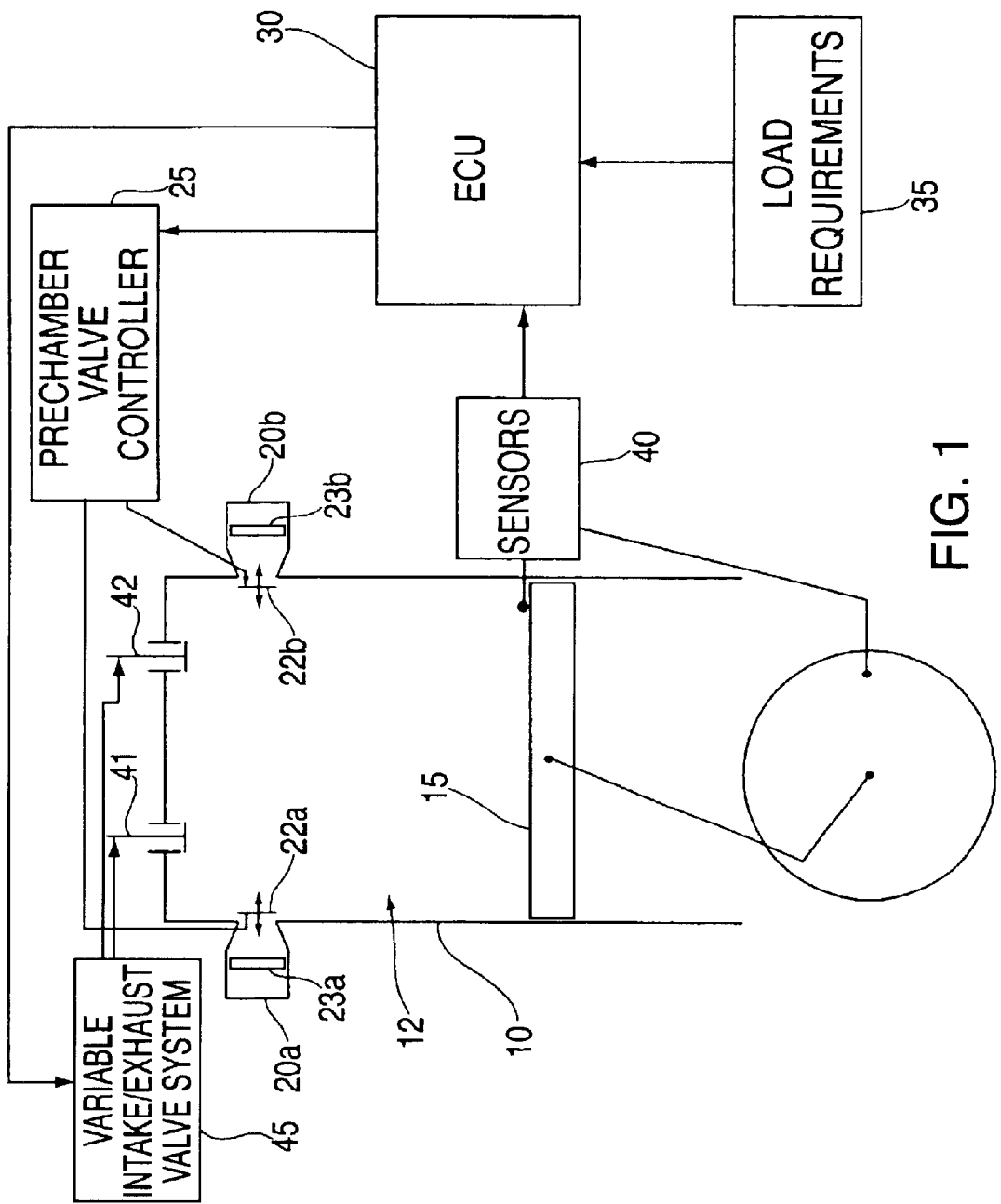
FIG. 1 shows a schematic diagram of an embodiment of an engine system that can be used in conjunction with the combustion method of the present invention.

FIG. 1 shows a schematic diagram of an embodiment of an engine system that can be used in conjunction with the HCJI technique according to the present invention. As shown, an engine cylinder 10 enclosing a charge space 12 and a piston 15 is coupled to one or more prechambers. In the depicted embodiment, two prechambers 20a, 20b are shown, each situated adjacent to the top of the cylinder and extending outwardly from its side surface. Each prechamber 20a, 20b includes a sliding piston 23a, 23b and the volume of the fuel-air mixture enclosed by the sliding pistons within each of the prechambers is two orders of magnitude smaller than the volume enclosed within the cylinder 10. The prechambers 20a, 20b also include one or more microvalves 22a, 22b which open and close an orifice leading from the prechambers into the cylinder, and an intake valve through which fuel and/or other additives may be added to enrich the fuel-air mixtures contained in the prechambers. An electronic control unit (ECU) 30 controls both the sliding of the prechamber pistons 23a, 23b and the opening and closing of the microvalves 22a, 22b and thereby is able to orchestrate the timing of the movements of these devices to correspond with the stroke cycle of the engine cylinder 10.

In particular, at any given instant of engine operation, the ECU controls the prechamber pistons 23a, 23b and the prechamber microvalves 22a, 22b based upon load requirement inputs 35 derived from the driver, and from inputs received from cylinder sensors 40 that indicate the current state of the engine (i.e., the temperature (T), pressure (P), equivalence ratio ($\Phi$), crank angle, etc., prevailing in each of the engine cylinders). The ECU also governs a variable intake/output valve system 45, which directly controls the input of fuel and air into the cylinder 15 via the intake valve 41, and the exhaust of combustion products through the exhaust valve 42.

FIG. 4a shows a longitudinal cross-section of an exemplary embodiment of a prechamber and microvalve assembly that may be used in the context of the method and system of present invention. It is to be understood that the assembly depicted is exemplary and that other types of prechamber and microvalve assemblies may also be used in the context of the present invention. As shown, the prechamber 20 is approximately cylindrical in shape, and may include a cone-shaped end surface 21 facing the cylinder at an end facing the engine cylinder 10. The cone-shaped end surface 21 includes a central orifice 26 that leads directly into the charge space of the cylinder. In an exemplary embodiment, the prechamber 20 may be dimensioned so as to range between 5 and 20 mm in diameter. The end surface 21 may protrude toward the cylinder between 1 and 5 mm, and the central orifice 26 may be between 0.5 and 3 mm in diameter.

Within the prechamber 20, a piston 23 is arranged to slide longitudinally forwards and backwards. In a forward movement, the piston 23 slides toward the cylinder in a compression stroke and thereby compresses the gases within the charge space 29 of the prechamber; in a backward movement, the piston slides away from the cylinder in an intake stroke, allowing the input of fresh fuel and air into the charge space 29. The piston 23 is coupled to two crank shafts 57 (of which one is visible in the cross-section), which are operated by a rotary mechanism 55 which may be implemented using a wheel coupled to a motor, cam shaft or other suitable mechanism for producing rotary movement. The rotary mechanism 55 is controlled by the ECU 30; through this arrangement, the ECU governs the timing of the compression and intake strokes of the piston 23.

According to the depicted embodiment, the piston 23 has a central opening through which a longitudinally-extending needle 24 passes. The needle 24 is coupled to an actuator mechanism 27, which is implemented as a magnetic solenoid and coil in FIG. 4a. By varying the voltage on the coil, the actuator can cause the needle 24 to shift forward or backward by a certain distance sufficient to either completely block or free the orifice 26 in the end surface 21. In this manner, the combined action of the actuator 27 and needle 24 can be used as a valve (or more specifically, a microvalve) to open or close the orifice 26 coupling the prechamber with the cylinder.

Fuel and/or premixed reactants may be supplied to the prechamber by activation of a pump 31 which draws fuel and reactants from a tank 37 and delivers them via a proportional or on/off switch 32 to one or more inlet passages 28 which drain at the prechamber. One or more check (non-return) valves 34 may also be included to prevent reverse flow along the inlet passages 28.

FIG. 4b shows a top view of the rotary mechanism and piston depicted in FIG. 4a. As shown, the rotary mechanism is implemented as a wheel that is turned by a coupling shaft 58. As the wheel turns, the ends of the shafts 57 follow a circumferential path and apply a pushing or pulling force on the piston 23 depending on the position of the shafts on the wheel.

FIG. 4c shows an alternative embodiment of a prechamber and microvalve assembly that may be used in the context of the present invention. In this embodiment, the microvalve comprises a piezo-actuated membrane 62 that is coupled at its center to a shortened needle 24a. The membrane is meta-stable, i.e., has a natural shape which it conforms to and maintains in the absence of an applied electric field. The needle/actuator arrangement can be configured so that the needle blocks the membrane and this keeps the microvalve in a closed state when the membrane is in its natural state. However, application of an electric field to the membrane causes the membrane to deform such that the needle 24a is drawn away from the end surface 21 of the prechamber, thus opening the microvalve. FIG. 4d shows a plan elevation of the piezo-actuated membrane 62 used in the embodiment of FIG. 4c. As shown, the membrane 62 may comprise a plurality of concentric sections 63a, 63b, and 63c. The innermost section 63c may be pierced with holes to allow reactants and products of combustion (the hot gas jets) to pass through from the prechamber charge space 29 into the cylinder 10 when the microvalve is open.

FIG. 4e shows an alternative actuator arrangement that may be used in the context of the assembly shown in FIG. 4a. In this case, the needle 24 is coupled to a piezoelectric stack 27b, which acts as the needle actuator, rather than a magnetic solenoid. The piezoelectric stack 27b includes layers of material that expand or contract in response to the application of an electric field across the layers of the stack. As the piezoelectric stack 27b is directly coupled to the needle 24, the expansion and contraction of the layers translate into a forward or backward motion of the needle, and to a closing or opening of the microvalve.

Figures 2A, 2B, 2C, 2D:
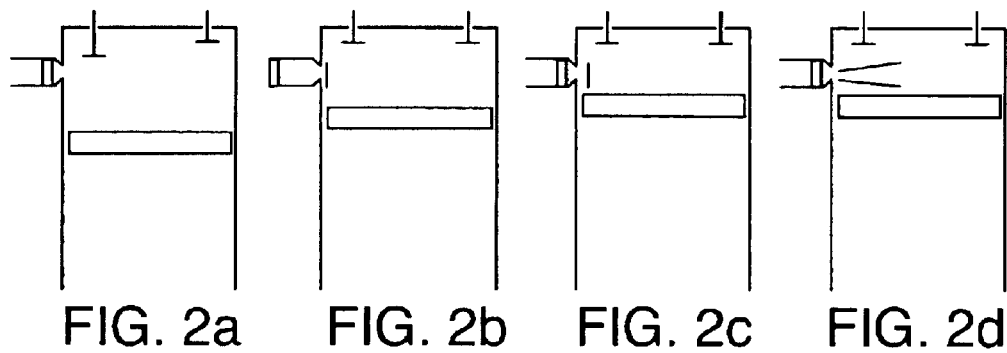
FIG. 2 shows various positions (a) through (d) of a cylinder piston during an engine cycle and corresponding prechamber piston and microvalve positions according to the method of the present invention.

FIG. 2 shows various positions (a) through (d) of a cylinder piston during an engine cycle and corresponding prechamber piston positions and microvalve states associated with movement of the cylinder piston according to the method of the present invention. While only a single prechamber is shown coupled to the cylinder in FIG. 2, it is to be understood that this is merely illustrative of a specific embodiment, and that other prechambers (located into or out of the page or on the opposite side of the cylinder) may be included to facilitate auto-ignition in the cylinder. Position (a) represents a point in the intake stroke in which the cylinder position is moving downward, during which the volume within the cylinder on top of the piston expands, causing the pressure in this volume to decrease. At this point, the intake valve of the cylinder is opened, and the decrease in pressure causes fresh air and fuel to be drawn through the intake orifice into the cylinder. At or nearly at this time, the prechamber piston begins to slide backwards, in a direction away from the cylinder, with the prechamber microvalve open, providing a prechamber intake stroke in which uncombusted gases enter the prechamber from the cylinder.

Between positions (a) and (b), fuel is injected into the prechamber and immediately thereafter the ECU directs the microvalve to close. The fuel injection increases the equivalence ratio value within the prechamber beyond the value of equivalence ratio within the cylinder. The early injection of fuel provides ample time for the fuel and air within the prechambers to be well-mixed and homogeneous. Additionally, early injection allows the fuel to be injected at lower pressures (lower energy), thereby increasing the efficiency of the engine. The relatively rich mixture in the prechambers is maintained in the prechambers during the interval between injection and microvalve closing due to the negative pressure difference between the prechambers and the cylinder.

At position (b) in FIG. 2, the piston in the cylinder is shown approaching a Top Dead Center (TDC) position. At this point, the prechamber piston starts to slide toward the cylinder, compressing the gases enclosed in the prechamber ("prechamber gases"). As the microvalve is closed, the prechamber is separated from the cylinder, preventing the compressed prechamber gases from exiting into the cylinder during compression and raising the pressure in the prechamber. As the prechamber piston slides, the pressure within the prechamber elevates quickly, so that at position (c), which depicts that completion of the prechamber piston compression stroke, the compression brings the pressure of the prechamber gases over the threshold for auto-ignition, causing the prechamber gases to auto-ignite in approximately one millisecond (1 ms). The term "approximately 1 ms" as used herein may be taken to mean any value below 1 millisecond and any value up to 1.6 milliseconds.

At position (d), which depicts the position of the cylinder piston and prechamber piston immediately following position (c), the microvalves are opened, allowing hot jets of combusted gases to exit from the prechamber into the cylinder. The exact timing of this sequence, in particular, the timing of the prechamber compression and consequent auto-ignition is calculated by the ECU based on the requested load demand and on the current operating parameters in the engine cylinder. The prechamber piston, once reaching the end of its compression stroke, remains at the said position throughout the time interval when the hot jets of combusted gases are emanating from the prechambers to the cylinder.

Operating conditions in the prechamber and cylinder are designed such that: i) at position (b) the conditions are well below the critical threshold for auto-ignition of the prechamber gases, so that inadvertent combustion does not occur; ii) upon compression of the prechamber gases at position (c), the threshold for auto-ignition is quickly and substantially crossed; and (iii) the conditions in the cylinder are close to, but below the auto-ignition threshold. According to the present invention, the conditions for auto-ignition in the cylinder occur during the time interval when the piston is close to the TDC position. To facilitate rapid auto-ignition during this interval, the prechambers are designed and operated so that the timing interval of auto-ignition can be precisely controlled, and in particular so that the timing interval corresponds to small changes in the cylinder piston position.

In addition, the delay between the end of the piston compression stroke and the moment when combustion occurs (which is approximately 1 ms for the prechamber auto-ignition), referred to as the auto-ignition delay time, is designed to be much shorter in the prechamber than in the cylinder, so that the timing of the release of the hot gas jets into the cylinder can be controlled to a high degree of precision. The shorter ignition delay times for prechamber auto-ignition reduces the probability that the prechamber will not auto-ignite (misfire) and also ensures that the auto-ignition in the prechamber can be used to induce auto-ignition within the cylinder.

Figure 3A:
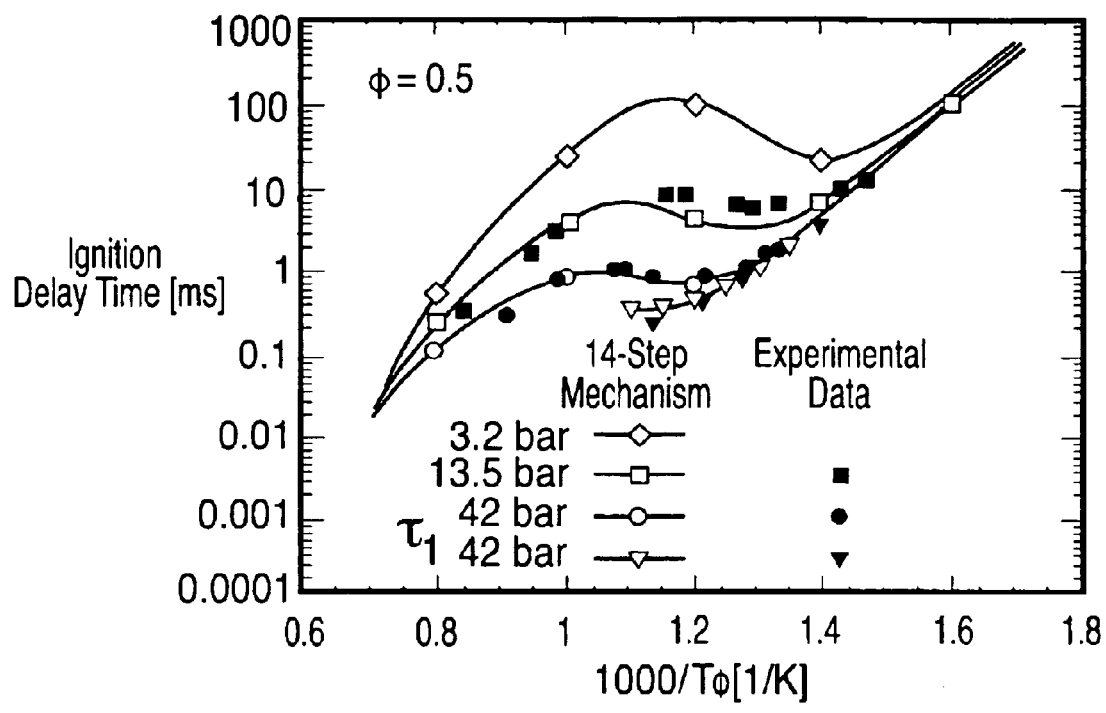
FIG. 3a shows plots of experimental data of ignition delay time versus inverse-temperature taken at three different pressure levels, for an equivalence ratio of 0.5.
Figure 3B:
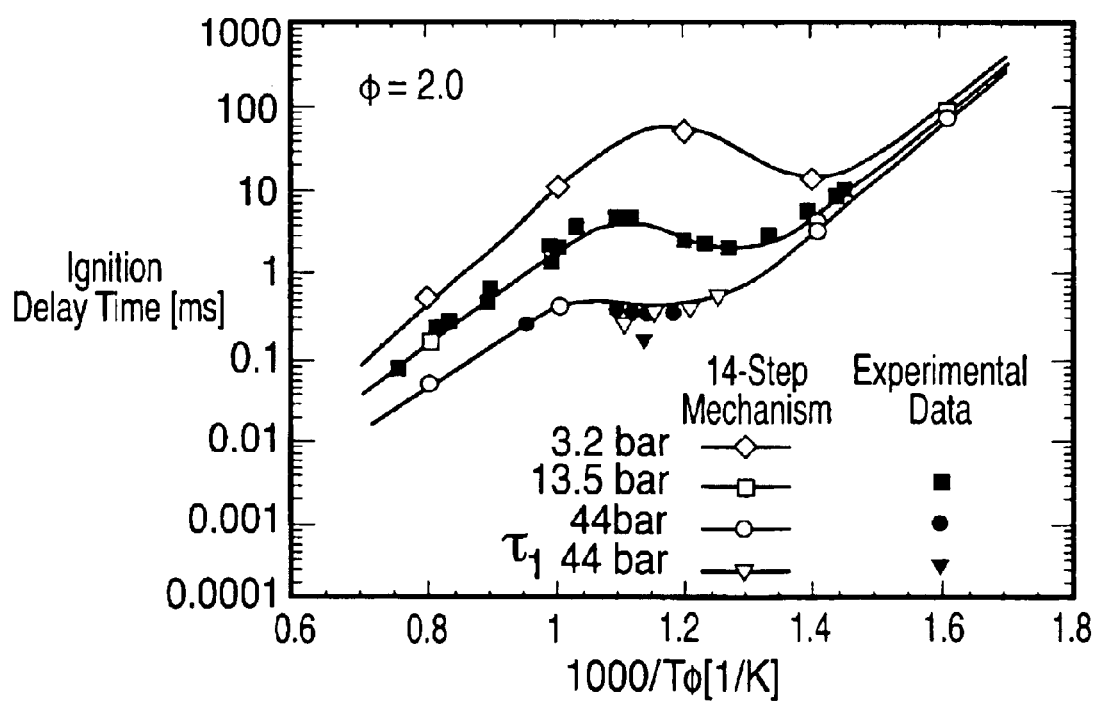
FIG. 3b shows plots of experimental data of ignition delay time versus inverse-temperature taken at three different pressure levels, for an equivalence ratio of 2.

As can be discerned in FIGS. 3a and 3b, the increase in pressure within the prechamber significantly reduces ignition delay time. FIGS. 3a and 3b each show plots of ignition delay time data versus inverse temperature taken at different pressures (13.5 bar, depicted with square data points, 44 bar depicted with circular points) at constant equivalence ratios, with the data shown in FIG. 4a being taken at an equivalence ratio of 0.5 and the data shown in FIG. 4b taken at an equivalence ratio of 2.0. As indicated, a comparison of FIGS. 3a and 3b indicates that rich mixtures (having an equivalence ratio of between 1.1 and 2), such as are maintained in the prechamber due to the fuel injection, have a much shorter delay time than lean mixtures, such as are maintained in the cylinder. Moreover, after prechamber compression, the prechamber pressure is significantly higher than that of the cylinder gases. When the temperature in the engine is well within the typical range (between 650 and 1100 degrees Kelvin), and the inverse temperature (1000/T) is between 1 and 1.3, a boost in pressure from 13.5 to 44 bar decreases the ignition delay time by approximately an order of magnitude from between 2 and 10 ms to between 0.2 to 1 ms. Since the pressures within the prechamber after compression are generally in the high range of 44 bar or above, this also serves to reduce the auto-ignition delay time within the prechamber.

Following ignition in the prechambers, jets of hot gases, which comprise a mixture of products of combustion and uncombusted reactants, are forced out of the prechambers through the open microvalves into the cylinder. The increase in temperature and pressure within the cylinder resulting from the incoming jets ensures that the threshold for auto-ignition within the cylinder is substantially surpassed, and that the contents of the cylinder auto-ignite. Thus, one of the main advantages of the present invention is that it makes use of the precise timing of auto-ignition in the prechambers to induce precisely-timed auto-ignition in the cylinder.

The HCJI system and method according to the present invention has the additional advantage over the PJC technique that HCJI jets are more energetic and bring about auto-ignition in the cylinder with greater certainty and rapidity by design; the PJC technique was never designed for achieving a complete auto-ignition but only for producing auto-ignition in the portion of reactants exposed to the PJC fireball. The controllability of auto-ignition in HCJI thus stems from the fact that HCJI utilizes volumetric combustion in the prechambers, which yields a higher and more rapid boost in pressure in the prechambers compared to the PJC technique.

In the foregoing description, the invention has been described with reference to a number of examples that are not to be considered limiting. It is to be understood and expected that variations in the principles of the systems and methods herein disclosed may be made by one skilled in the art and it is intended that such modifications, changes, and/or substitutions are to be included within the scope of the present invention as set forth in the appended claims.

What is claimed is:

1. A method of controlling auto-ignition timing in an internal combustion engine cylinder having a piston that is coupled to at least one prechamber having a prechamber piston, the method comprising:
   directly injecting fuel and air into the at least one prechamber;
   compressing gases within the at least one prechamber using the prechamber piston at precisely controlled times to cause auto-ignition in the at least one prechamber, the auto-ignition in the at least one prechamber producing hot gas jets; and
   inducing auto-ignition in the cylinder by introducing the hot gas jets from the at least one prechamber into the cylinder.

2. The method of claim 1, wherein each prechamber is coupled to the cylinder by at least one microvalve and each prechamber encloses a volume that is substantially smaller than a volume enclosed by the cylinder.

3. The method of claim 1, further comprising:
   enriching a fuel-air mixture in the at least one prechamber to a rich level prior to compression.

4. The method of claim 3, wherein the fuel-air mixture in the at least one prechamber is enriched to an equivalence ratio in the range of 1.1 to 2.5.

5. The method of claim 3, further comprising:
   controlling the prechamber piston to compress the gases in the prechamber when the cylinder piston is near a top dead center position with the at least one microvalve of the prechamber in a closed position;
   wherein auto-ignition occurs in the prechamber upon compression after a short time delay;
   wherein the prechamber piston, upon completing a compression stroke remains in position during auto-ignition in the prechamber and during an interval when hot gases emanate from the prechamber into the cylinder.

6. The method of claim 5, further comprising:
   opening the at least one microvalve immediately after auto-ignition in the prechamber occurs.

7. The method of claim 5, wherein the short time delay is approximately 1 millisecond (1 ms) in duration.

8. A system for homogeneous combustion jet ignition in an internal combustion engine cylinder comprising:
   at least one prechamber coupled to the cylinder via at least one microvalve including a prechamber piston; and
   an electronic control unit, the electronic unit receiving data regarding requested load demand and current operating parameters within the cylinder, the electronic control unit configured to control the prechamber piston and the at least one microvalve based on the received data so as to induce an auto-ignition within the at least one prechamber;
   wherein, upon auto-ignition in the at least one prechamber, hot gas jets are supplied to the cylinder from the at least one prechamber to induce auto-ignition in the cylinder.

9. The system of claim 8, wherein the at least one prechamber is situated near the top of the cylinder and encloses a volume that is substantially smaller than a volume enclosed by the cylinder.

10. The system of claim 9, wherein the electronic control unit precisely controls the piston of at least one prechamber to:
    (a) perform an intake stroke during an intake stroke of the cylinder piston;
    (b) begin a compression stroke during a compression stroke of the cylinder piston,
       (c) complete the compression stroke near a top-dead-center (TDC) position of the cylinder piston.
    (d) remain in place at the end of the compression stroke during auto-ignition in the prechamber and during a subsequent exhaust of hot gases from the at least one prechamber into the cylinder.

11. The system of claim 10 wherein the electronic control unit precisely controls the at least one microvalve of the least one prechamber to:
    (a) (a) remain open during the intake stroke of the prechamber piston;
    (b) (b) close during the compression stroke of the prechamber piston; and open following auto-ignition of the contents of the at least one prechamber
       (c) open following auto-ignition of the contents of the at least one prechamber.

12. The system of claim 8, further comprising:
    intake means for delivering fuel to the at least one prechamber.

13. The system of claim 8, wherein the at least one microvalve includes an actuator coupled to a needle, the actuator causing the needle to shift, the shift of the needle opening or closing an orifice in the prechamber that leads to the cylinder.

14. The system of claim 13, wherein the actuator comprises a magnetic solenoid and coil.

15. The system of claim 13, wherein the actuator comprises a piezoelectric stack.

16. The system of claim 13, wherein the actuator comprises a piezoelectric membrane.

17. A system for homogeneous combustion jet ignition in an internal combustion engine cylinder comprising:
    at least one prechamber coupled to the cylinder via at least one microvalve including a prechamber piston, the at least one prechamber being substantially smaller than the cylinder; and
    an electronic control unit, the electronic unit receiving data regarding requested load demand and current operating parameters within the cylinder, the electronic control unit configured to control the prechamber piston and the at least one microvalve based on the received data so as to induce an auto-ignition within the at least one prechamber;
    wherein a majority of fuel to be combusted is injected into the cylinder, and upon auto-ignition in the at least one prechamber, hot gas jets are supplied to the cylinder from the at least one prechamber to induce auto-ignition in the cylinder.

18. The system of claim 17, wherein the at least one prechamber includes two or more prechambers.

19. A method of controlling auto-ignition timing in an internal combustion engine cylinder having a piston that is coupled to at least one prechamber having a prechamber piston, the method comprising:
    compressing gases within the at least one prechamber using the prechamber piston at precisely controlled times to cause auto-ignition in the at least one prechamber, the auto-ignition in the at least one prechamber producing hot gas jets;

altering a fuel-air mixture in the at least one prechamber to a rich level prior to compression; and inducing auto-ignition in the cylinder by introducing the hot gas jets from the at least one prechamber into the cylinder.

* * * * *